US012244979B2

(12) United States Patent
Ren et al.

(10) Patent No.: US 12,244,979 B2
(45) Date of Patent: Mar. 4, 2025

(54) DEFECTIVE PIXEL DETECTION

(71) Applicant: TEXAS INSTRUMENTS INCORPORATED, Dallas, TX (US)

(72) Inventors: Jing-Fei Ren, Plano, TX (US); Hrushikesh Garud, Bangalore (IN); Rajasekhar Allu, Plano, TX (US); Gang Hua, Katy, TX (US); Niraj Nandan, Plano, TX (US); Mayank Mangla, Allen, TX (US); Mihir Narendra Mody, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 136 days.

(21) Appl. No.: 17/983,905

(22) Filed: Nov. 9, 2022

(65) Prior Publication Data

US 2024/0040096 A1 Feb. 1, 2024

Related U.S. Application Data

(60) Provisional application No. 63/392,951, filed on Jul. 28, 2022.

(51) Int. Cl.
*H04N 9/64* (2023.01)
*G06T 7/00* (2017.01)
*G06T 7/90* (2017.01)

(52) U.S. Cl.
CPC .......... *H04N 9/646* (2013.01); *G06T 7/0002* (2013.01); *G06T 7/90* (2017.01); *G06T 2207/10024* (2013.01); *G06T 2207/30168* (2013.01)

(58) Field of Classification Search
None
See application file for complete search history.

(56) References Cited

U.S. PATENT DOCUMENTS 7,274,393 B2 * 9/2007 Acharya .............. H04N 23/843
250/339.05
2015/0296193 A1 * 10/2015 Cote ..................... H04N 23/843
382/167

* cited by examiner

*Primary Examiner* — Mark T Monk
(74) *Attorney, Agent, or Firm* — Michael T. Gabrik; Frank D. Cimino (57) ABSTRACT

Various embodiments disclosed herein relate to defective pixel detection and correction, and more specifically to using threshold functions based on color channels to compare pixel values to threshold values. A method is provided herein that comprises identifying a color channel of an image pixel in a frame and identifying a threshold function based at least on the color channel. The method further comprises applying the threshold function to one or more nearest-neighbor values to obtain a threshold value and determining whether a corresponding sensor pixel is defective based at least on a comparison of the image pixel to the threshold value.

17 Claims, 8 Drawing Sheets

DEFECTIVE PIXEL DETECTION

RELATED APPLICATIONS

This application hereby claims the benefit and priority to U.S. Provisional Application No. 63/392,951, titled "METHOD FOR DEFECTIVE PIXEL CORRECTION IN 4×4 RGB-IR COLOR FILTER ARRAYS," filed Jul. 28, 2022, which is hereby incorporated by reference in its entirety.

TECHNICAL FIELD

This relates generally to defective pixel detection and correction, and more particularly to using threshold values to measure defects in values of pixels based on parameters of the pixels such as the location, color channel, and pixel arrangement.

BACKGROUND

Image sensors and imaging systems, such as camera-based systems, can produce images with red, green, and blue (RGB), and infrared (IR) pixels for visualization and processing. Image signal processing (ISP) techniques can be employed on such images to produce high-quality digital images. In one example of an ISP technique, color filter array (CFA) patterns can be used to capture color information by placing color filters over pixel sensors of an image sensor. Generally, 2×2 patterns of RGB filters are most commonly supported by ISP algorithms. Consequently, existing systems do not commonly support 4×4 RGBIR CFA processing. Processing of both RGB and IR pixels is important in a variety of uses, including safety features of electronic devices (e.g., Driver Monitoring Systems and Occupant Monitoring Systems), and other non-safety related features of devices, cameras, smart phones, and the like.

Traditional approaches can use programmable processing units and/or Vision Imaging Sub-Systems (VISS) pipelines capable of processing 2×2 color filter array (CFA) patterns, but such approaches also fail to process 4×4 RGBIR CFAs. For example, VISS can produce monochrome or multi-color digital images, but some such designs assume that a color filter has a fixed density in the CFA pattern with a specific number of neighboring pixels of the same color as a pixel at a location. Further, such approaches also fail to perform such analysis and pre-processing on raw domain RGBIR images.

SUMMARY

Disclosed herein are improvements to defective pixel detection and correction processes and techniques. An example embodiment includes a method of defective pixel detection. The method comprises identifying a color channel of an image pixel in a frame. The method further comprises identifying a threshold function based at least on the color channel of the image pixel and applying the threshold function to one or more nearest-neighbor values to obtain a threshold value. The method also comprises determining whether a corresponding sensor pixel is defective based at least on a comparison of the image pixel to the threshold value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF THE DRAWINGS

The drawings are not necessarily drawn to scale. In the drawings, like reference numerals designate corresponding parts throughout the several views. In some embodiments, components or operations may be separated into different blocks or may be combined into a single block.

DETAILED DESCRIPTION

Discussed herein are enhanced components, techniques, and systems related to defective pixel detection and correction. The term pixel is often used to refer to an image sensor pixel, the smallest identifiable portion of an image sensor that provides a discrete value based on received light, and to refer to an image pixel, the smallest identifiable portion of an image having a single value, which is often produced by a corresponding image sensor pixel. Often defective sensor pixels (e.g., dead pixels, hot pixels, cold pixels) (e.g., those sensor pixels which output a value inconsistent with the amount of incoming light), can form during the manufacturing of an image sensor or develop over time after production of the image sensor. Such defective pixels that develop in an image sensor following production may require users to employ dynamic defective pixel detection and correction methods to ensure that the resulting image pixels have values consistent with the amount of incoming light into an image sensor. While image sensors may capture light in various color channels, existing processors may not support defective pixel detection and correction of each of the color channels captured. Advantageously, apparatuses, devices, systems, and the like described herein can support image processing of any 2×2 CFA pattern as well as 4×4 RGBIR pattern images to detect and correct defective pixels. Accordingly, the improvements and methods described herein provide reliable and efficient ways to detect pixel defects on-the-fly, such as by analyzing groups of neighboring pixels and threshold ranges of acceptable pixel values for the input image.

One example includes a method of detecting and correcting defective pixels. The method comprises identifying a color channel of an image pixel in a frame; identifying a threshold function based on the color channel; applying the threshold function to one or more nearest-neighbor values to obtain a threshold value; and determining whether a corresponding sensor pixel is defective based on a comparison of the image pixel to the threshold value.

In another example, a pixel processing subsystem is provided. The pixel processing unit comprises a processing device and device memory operatively coupled to the processing device and system memory, wherein the device memory provides the pixel processing unit with pixel data from the system memory. The processing device of the pixel processing unit is configured to identify a color channel of an image pixel in a frame; identify a threshold function based on the color channel; apply the threshold function to one or more nearest-neighbor values to obtain a threshold value; and determine whether a corresponding sensor pixel is defective based on a comparison of the image pixel to the threshold value.

In yet another embodiment, a system is provided which comprises a defective pixel detection component and a pixel corrector component. The defective pixel detection component is configured to identify a color channel of an image pixel in a frame; identify a threshold function based on the color channel; apply the threshold function to one or more nearest-neighbor values to obtain a threshold value; and determine whether a corresponding sensor pixel is defective based on a comparison of the image pixel to the threshold value. The pixel corrector component is configured to correct the image pixel.

Figure 1:
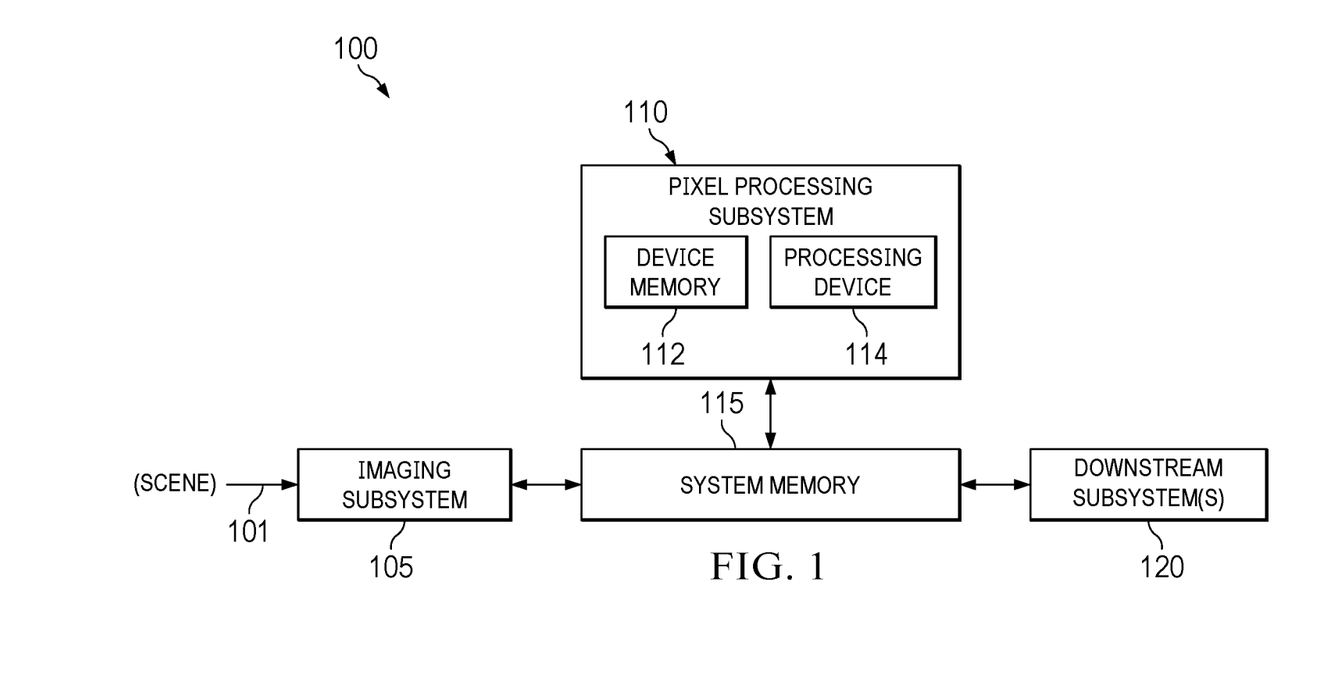
FIG. 1 illustrates an example system configurable to perform pixel detection and correction.

FIG. 1 illustrates an example system configurable to perform pixel defect detection and correction. FIG. 1 shows system 100, which further includes imaging subsystem 105, pixel processing subsystem 110, system memory 115, and downstream subsystems 120. Pixel processing subsystem 110 further includes device memory 112 and processing device 114. Pixel processing subsystem 110 may be configured to operate defective pixel detection and correction processes, such as process 200 of FIG. 2, to capture information about defective sensor pixels and respective locations of the defective sensor pixels. In an example embodiment, such processes can be performed on 2×2 patterned color filter array (CFA) inputs and/or 4×4 patterned CFA inputs with red, green, blue, and infrared (RGBIR) pixels.

In operation, imaging subsystem 105 is configured to receive or capture scene 101. Imaging subsystem 105 may be a camera, one or more image sensors, a camera-based driver monitoring system (DMS), a camera-based occupant monitoring system (OMS), or the like, capable of producing images, videos, or frames from scene 101. The output produced by imaging subsystem 105 can be made of a plurality of image pixels of various color channels, such as pixels in a 4×4 RGBIR CFA pattern, from scene 101. Each image pixel obtained from scene 101 may be associated with one of a red, blue, green, or infrared (IR) color channel, or any other color channel. Imaging subsystem 105 may then communicate pixel data from scene 101 to system memory 115.

Pixel processing subsystem 110 interfaces with system memory 115 to obtain the pixel data captured by imaging subsystem 105 and stored on system memory 115. Pixel processing subsystem 110 comprises device memory 112 and processing device 114 and is configured to perform defective pixel detection and correction, among other functions, on the pixel data. In some examples, pixel processing subsystem 110 retains the pixel data from system memory 115 on internal memory to pixel processing subsystem 110 (device memory 112) for more efficient use. In such cases, processing device 114 communicates and interfaces with device memory 112 to obtain the pixel data from device memory 112. In other examples, processing device 114 may obtain the pixel data directly from system memory 115.

Processing device 114 is configured to identify each image pixel in a frame captured by imaging subsystem 105 and process each pixel to detect defects in the image pixels, such as those caused by defective sensor pixels, noise, improper processing, etc. Accordingly, processing device 114 is first configured to identify the color channel of each image pixel. Processing device 114 then identifies one or more nearest-neighboring pixels with respect to a given pixel based on the color channel of the given pixel. For instance, if processing device 114 first identifies and selects a red pixel to evaluate, processing device 114 then finds a number of nearest-neighboring red pixels with respect to the selected red pixel. Once processing device 114 identifies the nearest-neighboring pixels, processing device 114 determines one or more nearest-neighboring values by calculating an average value of the nearest-neighboring pixels.

Next, processing device 114 identifies a threshold function based at least on the color channel of the given pixel. The threshold function(s) may be stored in look-up tables or other data structures, and each can be associated with one or more color channels or subsets of color channels. For example, an image pixel belonging to the red color channel (i.e., a red pixel) may be associated with a first threshold function, while a green image pixel may be associated with a second threshold function. In some examples, the threshold functions for red and blue image pixels are the same, and the threshold functions for green and IR image pixels are the same. Depending on the color channel of the given image pixel, processing device 114 applies the corresponding threshold function to the nearest-neighboring values to obtain a threshold value. Applying the threshold function may entail using mathematical functions, equations, and/or algorithms to produce the threshold value. Processing device 114 can then determine if a given image pixel is associated with a defective sensor pixel or is otherwise defective by comparing the given image pixel to the threshold value. More specifically, in some examples, comparing the given image pixel may refer to comparing the given image pixel with the nearest-neighbor values in the context of the threshold value.

If processing device 114 determines that the given image pixel is defective, pixel processing subsystem 110 can store information about the given image pixel, such as the color channel of the pixel, the location of the image pixel in the frame, the nearest-neighboring image pixels and their respective locations with respect to the given image pixel, and the like, in device memory 112. Device memory 112 may have one or more buffers, among other components, capable of storing such information, and it may be configured to generate a list and count of all the detected defective pixels found in the frame during the processes described herein. Device memory 112 can then provide information about the defective pixels to system memory 115.

After determining that one or more image pixels are defective, processing device 114 can correct the image pixels. Correcting an image pixel may entail changing the value of the image pixel to align with the average nearest-neighboring value, or one of the nearest-neighboring pixel values, for example. In several instances, processing device 114 repeats the defect detection processes to evaluate all of the image pixels in the frame before correcting the defective pixels. However, in other instances, processing device 114 may correct each defective pixel as a defect is discovered. Regardless of how processing device 114 is configured to correct the image pixels, processing device 114 can provide the corrected image pixels to device memory 112 once each or all the defective pixels are corrected.

Following the correction of any defective image pixels, processing device 114 can provide the corrected image pixels and any pixel data (e.g., location data) corresponding to the corrected image pixels to device memory 112. Device memory 112 can then provide the corrected image pixels and corrected image pixel data to system memory 115 for downstream use. Processing device 114 may, instead or in addition, directly provide the corrected image pixels to system memory 115. System memory 115 can further interface with one or more subsystems or devices of downstream subsystems 120 to provide the subsystems with information about the pixels of the frame, like defective pixel data and the corrected image pixels.

Still referring to FIG. 1, processing device 114 is representative of fixed-purpose hardware capable of implementing the defective pixel detection processes described herein. In some implementations, processing device 114 may also be capable of implementing the defective pixel correction processes disclosed herein. Examples of processing device 114 include integrated circuits (ICs), application specific integrated circuits (ASICs), logic devices, and other such circuitry, as well as any combination or variation thereof. Alternatively, processing device 114 may be implemented as general purpose hardware, such as a microprocessor, capable of executing software and/or firmware that embodies the logic of the defective pixel detection processes disclosed herein. Processing device 114 may be implemented within a single processing device, but it may also be distributed across multiple processing devices or subsystems that cooperate in executing instructions.

Device memory 112 may comprise any computer-readable storage media capable of being read and written to by pixel processing subsystem 110 and other components of system 100. Device memory 112 may include volatile and nonvolatile, removable and non-removable media implemented in any method of technology for storage of information. Likewise, system memory 115 may also comprise any computer-readable storage media capable of being read and written to by imaging subsystem 105, pixel processing subsystem 110 and other components of system 100. System memory 115 may include volatile and nonvolatile, removable and non-removable media implemented in any method of technology for storage of information. Device memory 112 may be implemented separately from system memory 115, but it may also be implemented in an integrated manner with respect to system memory 115.

Figure 2:
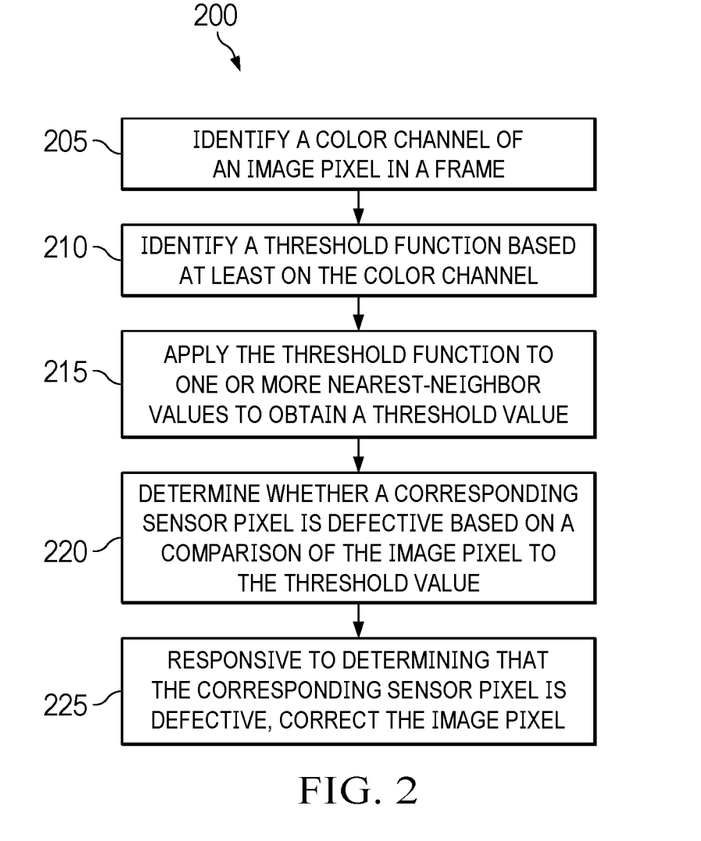
FIG. 2 illustrates a series of steps for detecting and correcting defective pixels in a pixel processing device.

Moving to FIG. 2, FIG. 2 illustrates a series of steps for detecting defective pixels of an input. FIG. 2 includes process 200 described parenthetically below, which references elements of FIG. 1. Process 200 can be implemented on fixed-purpose, dedicated hardware, programmable hardware, or a combination thereof. For example, process 200 can be performed by a pixel processing device or another apparatus or device, such as one or more components of system 100 of FIG. 1.

In operation 205, pixel processing subsystem 110 identifies (205) a color channel of an image pixel in a frame produced by imaging subsystem 105. Imaging subsystem 105 includes one or more components capable of capturing an image, video, frame, and/or the like from a scene 101. The frame, or other output of imaging subsystem 105, captured from scene 105 may be made of a plurality of image pixels of various color channels, such as pixels in a 4×4 CFA RGBIR pattern. Accordingly, each image pixel in the frame may be associated with one of a red, blue, green, or infrared (IR) color channel, which can be identified by pixel processing subsystem 110.

Additionally, pixel processing subsystem 110 identifies one or more nearest-neighboring image pixels with respect to the image pixel based on the color channel of the image pixel. For instance, pixel processing subsystem 110 first identifies that the image pixel is a red pixel. Then, pixel processing subsystem 110 identifies a number of nearest-neighboring red pixels with respect to the red pixel. Using the nearest-neighboring pixels, pixel processing subsystem 110 determines one or more nearest-neighboring values by calculating an average value of the nearest-neighboring image pixels.

In operation 210, pixel processing subsystem 110 identifies (205) a threshold function based on the color channel of the image pixel in the frame. Each color channel found in the frame may be associated with one or more threshold functions. For example, the red color channel may correspond to a first threshold function of multiple threshold functions. In other embodiments, subsets of the color channels may belong to the same threshold function(s). More specifically, in such embodiments, the threshold function related to the red color channel may also be used for the blue color channel as well. Several combinations and variations are possible but are not disclosed herein for the sake of brevity.

Next, in operation 215, pixel processing subsystem 110 applies (215) the threshold function to the one or more nearest-neighboring values to obtain a threshold value. Applying the threshold function may entail using mathematical functions, equations, and/or algorithms to produce the threshold value. The threshold value may be indicative of whether the image pixel is defective or not. Generally, for example, the threshold value may be an upper threshold limit that represents one or more values that, when exceeded, indicate a defective value. In other examples, the threshold value may be considered breached based on any number of criteria.

In operation 220, pixel processing subsystem 110 determines (220) whether a corresponding sensor pixel is defective based at least on a comparison of the image pixel to the threshold value. If the sensor pixel exceeds or does not meet the threshold value, for example, pixel processing subsystem 110 can determine that the sensor pixel is defective. On the other hand, if the sensor pixel does not exceed or meets the threshold value, pixel processing subsystem 110 can determine that the sensor pixel is not defective. The threshold value may be a single value, or it can be a range of values determined in operation 215.

Lastly, in operation 225, responsive to determining whether the corresponding sensor pixel is defective, pixel processing subsystem 110 corrects (225) the respective image pixel. Correcting the image pixel may entail changing the value of the pixel to align with the average nearest-neighboring value or one of the nearest-neighboring image pixel values, among other combinations or variations. In some instances, pixel processing subsystem 110 repeats operations 205, 210, 215, and 220 prior to correcting the image pixel, so that it can evaluate all the image pixels in the frame before performing correction processes. However, in other instances, pixel processing subsystem 110 may correct each defective pixel as a defect is discovered.

Figure 3:
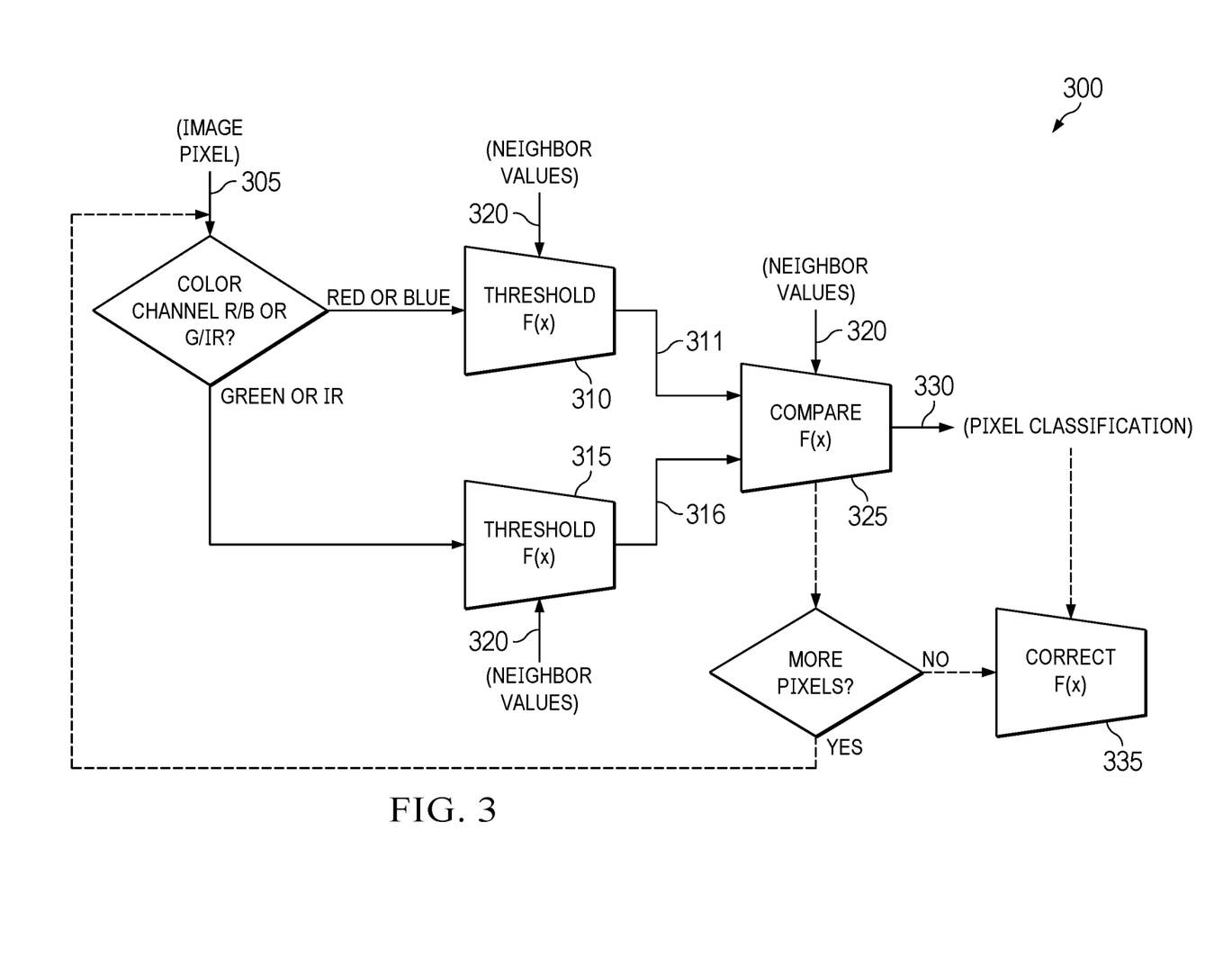
FIG. 3 illustrates an example operating environment for pixel defect detection and correction.

FIG. 3 illustrates an example operating environment for pixel detection and correction. FIG. 3 includes operating environment 300 which further includes threshold functions 310 and 315, compare function 325, and correct function 335. The functions of operating environment 300 may be used to detect and correct defects in image pixels from a scene. The processes performed within operating environment 300 may be repeated for any number of pixels. The functions and components of operating environment 300 may be performed by a pixel processing subsystem, such as pixel processing subsystem 110 of FIG. 1, or any fixed-purpose, dedicated hardware component(s).

In operating environment 300, an image pixel 305 is supplied as an input to a system, apparatus, or device configured to examine image pixel 305 for defects. Image pixel 305 is one pixel of a plurality of image pixels in a frame, and it belongs to one color channel of multiple color channels (e.g., red, blue, green, IR). One or more nearest-neighboring image pixels, with respect to image pixel 305, can also be identified in the frame. A number, p, of nearest-neighboring image pixels of the same color channel as image pixel 305 can be defined as {x1, x2, . . . , xp}. The values of the nearest-neighboring image pixels, neighbor values 320, may further be defined as {x(1), x(2), . . . , x(p)}, or in ascending order. Threshold functions 310 and 315 perform one or more operations on the nearest-neighboring image pixels, such as mathematical functions, equations, and/or algorithms, to produce threshold values 311 and 316, respectively. In various scenarios, the threshold values are a function of mean 'a' where a=[x(2)+x(p−1)]/2, and the threshold value can be calculated using the equation T=f(a). The function, f, can be a piecewise linear function that can be calculated on the fly depending on the color channel of the pixel.

In an example, the piecewise linear function can have up to S segments. In such an example, a lookup table of size 'b' may include a number of unique knee points to define individual segments of a piecewise linear function, f. Specifically, the lookup table may have 7 unique knee points to define 8 segments of the functions, whereby b[0]=0<b[1]<b[2]<b[3]<b[4]<b[5]<b[6]<b[7]. The segment, s, in which a particular mean 'a' falls can be found using the following equation:

$$s = \begin{cases} \underset{i \in \{0, 1, \ldots, 6\}}{\arg} (b[i] \le a < b[i+1]) & \text{IF } a < b[7] \\ 7 & \text{Otherwise} \end{cases}.$$

The color channel of pixel 305 may be one among red, blue, green, or IR. The red, blue, and green color channels may have different dynamic ranges than the IR color channel, so more than one lookup tables may exist to analyze the different color channels. In the illustrated embodiments, a first set of threshold functions is used for red and blue channels, and a second set of threshold functions is used for green and IR channels. In further examples, sets of threshold functions may be assigned to any combinations of channels, or a single set of functions may be assigned only to a single channel. Within any set of threshold functions, any number of unique knee points and segments can be defined in the lookup table as necessary to perform the techniques described herein.

In another example, the function, f, can be a piecewise linear function that can be calculated on the fly, depending on the color channel of the pixel. The piecewise linear function value can be calculated using the following equation:

$$f(a)=t(s)+m(s)x(a-b(s)).$$

In this equation, s, in [0 . . . S−1], is the segment in which 'a' falls. B(s) is the base value of 'a' for the segment, s, and t(s) and m(s) are the base threshold and the slope for the function, f, in the segment, s, respectively. The (S−1) base, base threshold, and slope value tuples required can be stored and executed in the threshold functions.

In another example, the piecewise linear function knee points can be implicitly defined as b(0)=0, b(k)=$2^{k+8}$ ∀k∈ [1 . . . 7]. Here, the distance between consecutive knee points increases exponentially.

Referring back to operating environment 300 of FIG. 3, if image pixel 305 belongs to the red or blue color channel, threshold function 310, using one of the piecewise linear function examples discussed, can be selected and applied to the nearest-neighboring image pixels of image pixel 305. If image pixel 305 belongs to the green or IR color channel, threshold 315 can be selected and applied. For a red pixel, image pixel 305, threshold function 310 can output threshold value 311 associated with the nearest-neighboring image pixels of pixel 305 as input to compare function 325. The values of the nearest-neighboring image pixels, or neighbor values 320, can also be input to compare function 325. Compare function 325 performs a comparison between image pixel 305 and a function of threshold value 311 and neighbor values 320 to determine whether image pixel 305 is defective or not. This may entail, instead, determining whether a corresponding sensor pixel associated with image pixel 305 is defective, and thus, determining that image pixel 305 is defective. Compare function 325 can employ the following operation to determine whether image pixel 305 is defective, wherein image pixel 305 is defined as "y" and the location of image pixel 305 in the frame is defined as (i,j):

$$d(i, j) = \begin{cases} \text{True} & \text{IF } (y < x(1) - T \text{ OR } y > x(p) + T \\ \text{False} & \text{Otherwise} \end{cases}$$

where x(1) denotes the neighbor image pixel with the smallest value and x(p) denotes the neighbor image pixel with the greatest value. Depending on the output of the comparison, compare function 325 can produce pixel classification 330 that denotes the determination.

In some instances, if additional pixels remain to be evaluated, the defect detection process can repeat before the correction process begins. However, if there are no additional pixels to be evaluated, and the pixel classification 330 identifies that image pixel 305 is defective, image pixel 305 can be input to correct function 335 to be corrected. Correcting image pixel 305 may entail changing the value of image pixel 305 to align with threshold value 311, the average nearest-neighboring value ('a'), or one of the nearest-neighboring image pixel values (neighbor values 320). More specifically, if image pixel 305 needs to be corrected due to a defect, correct function 335 can produce a corrected output, y', using the following operation:

$$y' = \begin{cases} x(p) & \text{IF } (y > x(p) + T) \\ x(1) & \text{IF } (y < x(1) - T) \\ y & \text{otherwise} \end{cases}.$$

Figure 4:
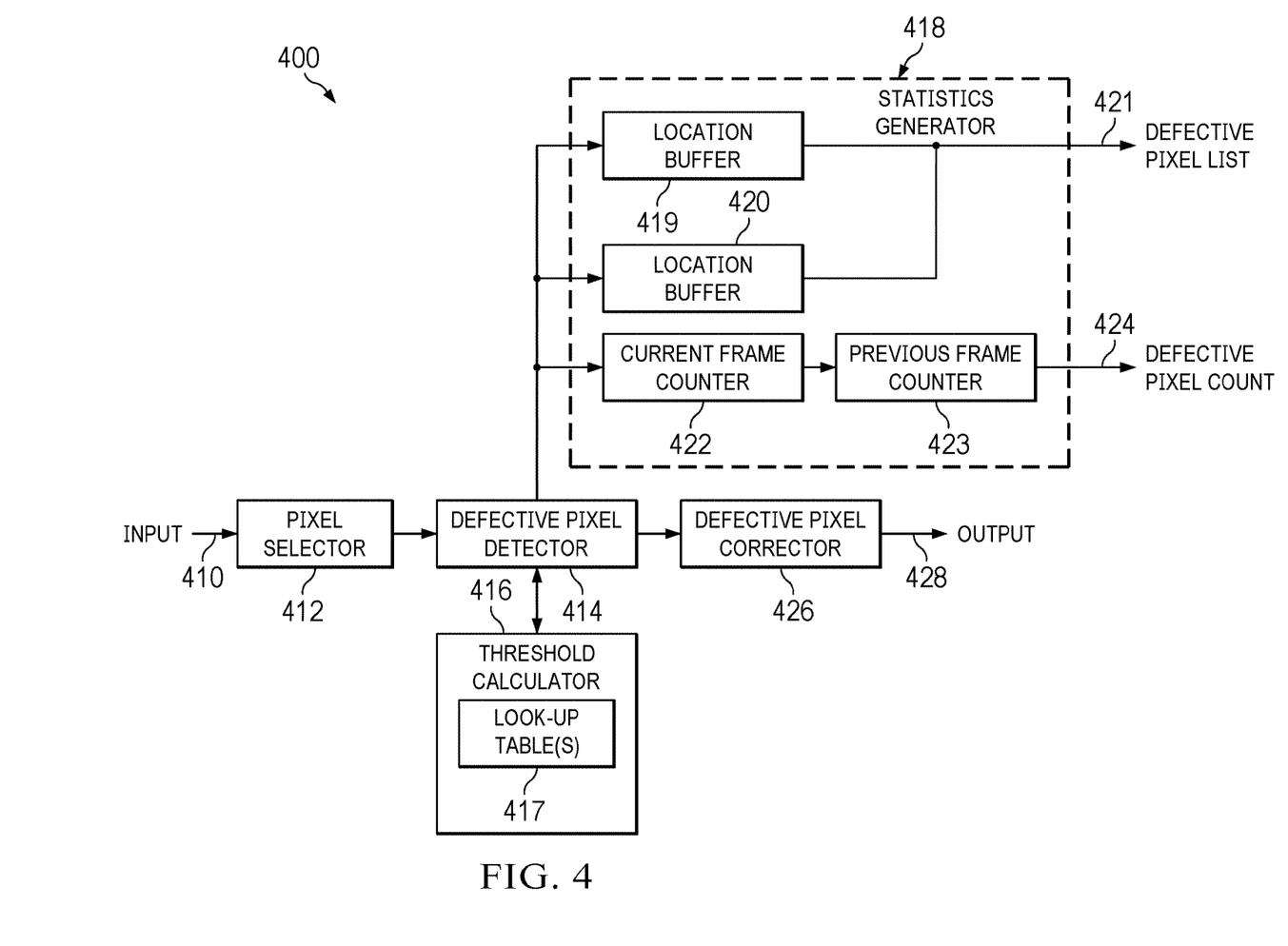
FIG. 4 illustrates an example operating environment for pixel defect detection, correction, and statistics generation.

FIG. 4 illustrates an example operating environment for pixel detection and correction. FIG. 4 includes operating environment 400 which further includes pixel selector 412 that reads an input 410, defective pixel detector 414, threshold calculator 416, statistics generator 418, and defective pixel corrector 426. Statistics generator 418 further includes location buffers 419 and 420 which produce defective pixel list 421, and current frame counter 422 and previous frame counter 423 which produce defective pixel count 424. Operating environment 400 can be configured to perform image pixel detection and correction processes, such as process 200 of FIG. 2 and/or process 500 of FIG. 5, and to capture information about defective image pixels and respective locations of the defective pixels.

To begin, pixel selector 412 is supplied with input 410, which may be one or more images, videos, or frames captured by an imaging subsystem. Input 410 may be made of a plurality of image pixels of various color channels, such as pixels in a 2×2 Bayer CFA or a 4×4 CFA RGBIR pattern. Accordingly, each image pixel may be associated with one of a red, blue, green, or IR color channel, among other color channels. Pixel selector 412 can be configured to identify each image pixel of input 410 and a color channel of each of the image pixels. Pixel selector 412 may first select one image pixel of input 410 and identify an associated color channel. Pixel selector 412 can then be configured to identify one or more nearest-neighboring image pixels, with respect to the selected image pixel, based on the color channel of the selected image pixel. For instance, if pixel selector 412 first identifies and selects a blue pixel of input 410, pixel selector 412 then finds a number of nearest-neighboring blue pixels with respect to the selected blue pixel. Once pixel selector 412 selects the pixels, pixel selector 412 provides the selected image pixel and the identified nearest-neighboring image pixels to defective pixel detector 414.

Defective pixel detector 414 may be configured to perform one or more algorithms or operations on the image pixels to determine whether the selected image pixel is defective. Alternatively, or in addition, defective pixel detector 414 may be configured to determine whether a corresponding sensor pixel associated with the selected image pixel is defective. In various examples, defective pixel detector 414 determines one or more nearest-neighboring values by calculating an average value of the identified nearest-neighboring image pixels. Defective pixel detector 414 is also configured to identify a threshold function from threshold calculator 416 based at least on the color channel of the selected image pixel. Threshold calculator 416 stores the threshold functions in look-up tables 417. Each of the threshold functions of look-up tables 417 can be associated with one or more color channels or subsets of color channels. For example, a blue pixel may be associated with a first threshold function, while an IR pixel may be associated with a second threshold function. In some examples, the threshold functions for red and blue pixels are the same, and the threshold functions for green and IR pixels are the same.

Depending on the color channel of the given image pixel, defective pixel detector 414 instructs threshold calculator 416 to select the corresponding threshold function from look-up tables 417 and apply the threshold function to the nearest-neighboring values to obtain a threshold value. In applying the threshold function, threshold calculator 416 may employ mathematical functions, equations, and/or algorithms to produce the threshold value. Threshold calculator 416 can then provide the threshold value to defective pixel detector 414. Defective pixel detector 414 is configured to perform a comparison between the selected image pixel and the threshold value. Based on the results of the comparison, defective pixel detector 414 can determine whether the selected image pixel, or a corresponding sensor pixel, is defective or not.

For detected defective image pixels or sensor pixels, defective pixel detector 414 can provide information about the defective pixels to statistics generator 418. Statistics generator 418 includes location buffer 419 and location buffer 420, which can store a number of detected defective pixels in a given frame of input 410. These location buffers can store information about defective pixels, such as the location of the pixel in the frame (e.g., 2D locations such as row and column), a value of the defective pixel, and the like. In various examples, statistics generator 418 stores location values of the defective pixels as binary values (e.g., 13-bit binary values) in a packed format (e.g., 26-bit packed format). The defective pixels stored in location buffer 419 can be different defective pixels than those stored in location buffer 420. Accordingly, this may allow one location buffer to be used for writing and storing a newly detected defective pixel while the other location buffer can be used for reading information about a previously detected defective pixel. Metrics, such as defective pixel list 421, can be created among the information in location buffers 419 and 420. In other examples, however, the defective pixels can be stored in other formats or in different sequential orders.

Statistics generator 418 also includes current frame counter 422 and previous frame counter 423. Like location buffers 419 and 420, current frame counter 422 and previous frame counter 423 can be used for reading and writing different frame values simultaneously or in sequence. For example, for a defective pixel, current frame counter 422 may be configured to write the location in the current frame where the defective pixel was detected. Then, for a subsequently detected defective pixel, previous frame counter 423 can store the value of a previous frame where a defective pixel was detected (e.g., current frame counter 422), and current frame counter 422 can capture the information related to the subsequently detected defective pixel. From the frame counters, statistics generator 418 can produce further metrics, such as defective pixel count 424, corresponding to the frame of input 410.

Defective pixel list 421 and defective pixel count 424 are indicative of a number of defective pixels identified in a given frame or image, and they may be used to tune one or more threshold functions of threshold calculator 416. By way of example, if multiple consecutive pixels are detected, defective pixel detector 414 can instruct threshold calculator 416 to change one or more portions of look-up tables 417 to reduce the number of defective pixels discovered. Other variations or examples can be contemplated but are not explained for the sake of brevity.

Still referring to FIG. 4, once defective pixel detector 414 determines that a selected image pixel is defective, it can be configured to provide the defective image pixel to defective pixel corrector 426. Defective pixel corrector 426 can be configured to correct the defective image pixel(s). Correcting a defective image pixel may entail changing the value of the pixel to align with the threshold value, the average nearest-neighboring value, or one of the nearest-neighboring pixel values. In some examples, defective pixel detector 414 may provide defective pixel corrector 426 with a defective image pixel immediately after each defective image pixel is detected. However, in other examples, defective pixel detector 414 may wait until it has processed all image pixels of input 410 for defects. At that point, pixel defect detector 414 can then provide defective pixel corrector 426 with all the defective image pixels for correction. Regardless of the order of detection and correction, defective pixel corrector 426 can produce output 428, which comprises one or more corrected image pixels.

Statistics generator 418 can comprise one or more non-transitory, computer-readable media configured to operate as discussed herein. Statistics generator 418 may be included as part of defective pixel detector 414, or it may function independently and/or externally from other components of operating environment 400. Similarly, threshold calculator 416 may also comprise one or more non-transitory, computer-readable media wherein look-up tables 417 are stored and obtained from. Threshold calculator 416 can be included as part of defective pixel detector 414, or it may function externally and/or independently from other components of operating environment 400. To communicate with threshold calculator 416 and/or statistics generator 418, defective pixel detector 414, or another component, may utilize various wireless or wired communication protocols.

Figure 5:
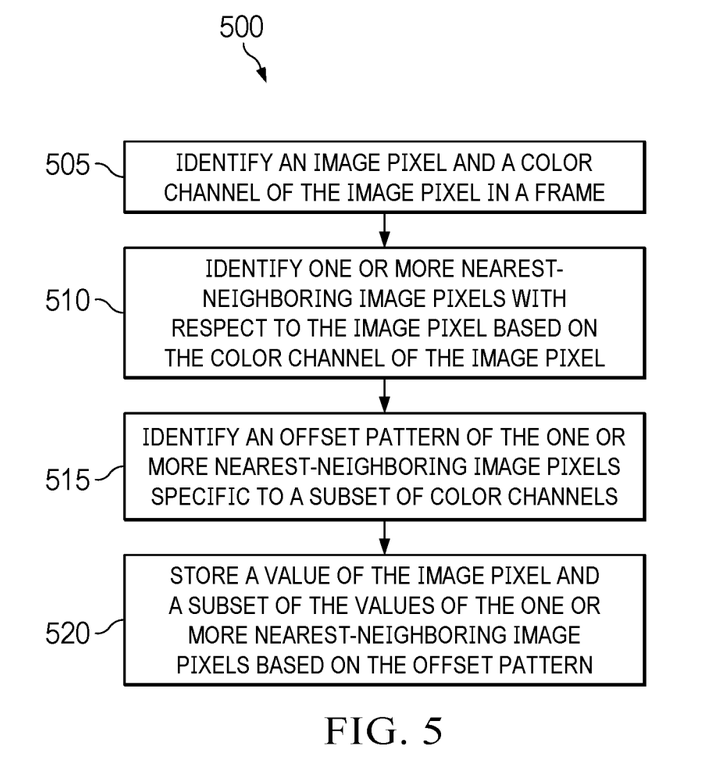
FIG. 5 illustrates a series of steps for optimizing memory storage while detecting pixel defects.

FIG. 5 illustrates a series of steps for optimizing memory storage while detecting pixel defects. FIG. 5 includes process 500 described parenthetically below, which references elements of FIG. 1. Process 500 can be implemented on fixed-purpose, dedicated hardware. For example, process 500 can be performed by a pixel processing subsystem or another apparatus or device with components of system 100 of FIG. 1.

In operation 505, pixel processing subsystem 110 identifies (505) an image pixel and a color channel of the pixel in a frame produced by imaging subsystem 105. Imaging subsystem 105 includes one or more components capable of capturing an image, video, frame, and/or the like from a scene 101. The frame, or other output of imaging subsystem 105, captured from scene 105 may be made of a plurality of pixels of various color channels, such as image pixels in a 4×4 CFA RGBIR pattern. Accordingly, pixel processing subsystem 110 can associate each image pixel with a color channel (red, blue, green, or infrared (IR) color channel) and determine where each image pixel is located in the frame (i.e., the arrangement of image pixels with respect to one another).

Next, in operation 510, pixel processing subsystem 110 identifies (510) one or more nearest-neighboring image pixels with respect to the image pixel based on the color channel of the pixel. The nearest-neighboring image pixels may be image pixels adjacent to, above, below, or any direction from the identified image pixel. In many example color filter arrays, green and IR sensor pixels have more neighboring pixels than red and blue pixels do, so the number and positions of nearest-neighboring image pixels identified may vary based at least on the color channel of the image pixel. By way of example, pixel processing subsystem 110 first identifies that the image pixel identified in operation 505 is a red pixel. Then, pixel processing subsystem 110 identifies a number of nearest-neighboring red pixels with respect to the red pixel. In this example, pixel processing subsystem 110 can identify eight neighboring red pixels located in proximity with respect to the identified red pixel.

In operation 515, pixel processing subsystem 110 identifies (515) an offset pattern of the one or more nearest-neighboring pixels specific to a subset of color channels. Following the previous example, pixel processing subsystem 110 can identify eight neighboring red pixels that are arranged in a diamond-shaped pattern around the identified red pixel. The pixels that make up the diamond-shaped pattern may be one or more rows and/or columns away from the identified red pixel. In a different example, if the identified pixel belongs to the green or IR color channel, pixel processing subsystem 110 can identify a different offset pattern, such as a square pattern having a number of nearest-neighboring pixels in a square-shaped pattern around the identified pixel. In this different example, the square pattern can include four pixels. However, a configuration with a different number of pixels can be identified.

Lastly, in operation 520, pixel processing subsystem 110 stores (520) a value of the image pixel and a subset of the values of the one or more of the nearest-neighboring image pixels based on the offset pattern. Because pixel processing subsystem 110 can identify the arrangement of image pixels in the frame and which color channel each image pixel belongs to, pixel processing subsystem 110 can further be configured to not store, or discard, certain pixel data that does not relate to the identified image pixel and the one or more nearest-neighboring image pixels. For example, pixel processing subsystem 110 may recognize that the pixel arrangement has nine rows and columns (9×9 arrangement) of pixels. However, pixel processing subsystem 110 can also recognize that this arrangement contains excess pixels unnecessary for detecting defects in an image pixel of a certain color channel. For instance, if pixel processing subsystem 110 is currently detecting defects in a red pixel, it need not use blue, green, or IR pixels to find a defect in the red pixel. Pixel processing subsystem 110 can consequently remove some of the unrelated pixels (e.g., pixels from other color channels with respect to a given pixel and/or non-nearest-neighboring pixels) from the arrangement before storing the arrangement in device memory 112.

By way of example, when pixel processing subsystem 110 is evaluating a blue or red pixel, pixel processing subsystem 110 can discard the second row from the top of the 9×9 arrangement if it does not detect any blue or red pixels in that row. Pixel processing subsystem 110 can further discard any non-blue or red pixels from the first row from the top of the arrangement. Advantageously, this can increase storage savings in device memory of a pixel processing subsystem 110, for example, among other benefits.

Figure 6:
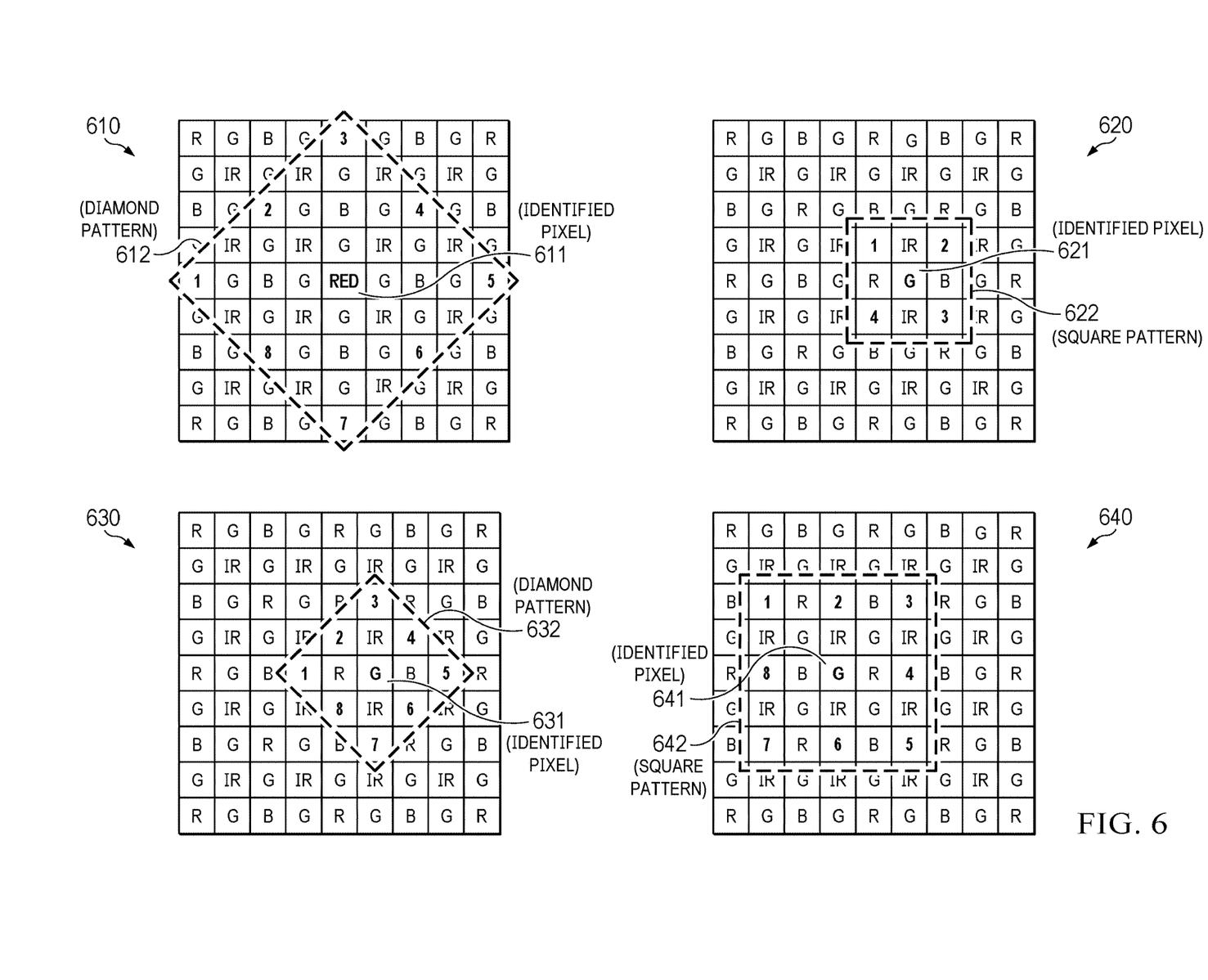
FIG. 6 illustrates example pixel arrangements used for detecting defects in a given pixel.

FIG. 6 illustrates example pixel arrangements used for detecting defects of a given image pixel. FIG. 6 includes aspect 610, aspect 620, aspect 630, and aspect 640. Each aspect represents an exemplary pixel arrangement producible by components of system 100 of FIG. 1, for example, to evaluate image pixels of an input. In various embodiments, pixels may be organized in one of several patterns, such as diamond pattern 612, square pattern 622, diamond pattern 632, or square pattern 642, based on a color channel of the image pixel being evaluated for a defect. However, in other examples, other combinations and/or variations of color patterns may be contemplated.

In aspect 610, a 9×9 pattern of pixels of varying color channels is demonstrated. Aspect 610 may represent the entirety of pixels of an input (e.g., an image), or it can represent a subset of the entirety of pixels of the input. Identified pixel 611 represents one image pixel selected during a defective pixel detection process. In aspect 610, identified pixel 611 is a red image pixel. A pixel processing subsystem, such as pixel processing subsystem 110 of FIG. 1, can be configured to identify nearest-neighboring pixels, with respect to identified pixel 611, of the same color channel as identified pixel 611 (i.e., red). The nearest-neighboring pixels in aspect 610 are numbered 1-8, and together, they form a diamond pattern 612 within the arrangement. In another example wherein the identified pixel is a blue pixel, a similar diamond pattern can also be identified by a pixel processing subsystem. This shape of pattern may be recognized due to the sparsity of blue and red pixels in aspect 610, among other reasons.

In aspect 620, the same 9×9 pattern of pixels as aspect 610 is demonstrated. However, in aspect 620, the identified pixel 621 is a green image pixel. In this example, because there are more green pixels nearby identified pixel 621, a pixel processing subsystem can select and identify nearest-neighboring green image pixels in a square pattern 622. Such nearest-neighboring pixels are numbered 1-4 in aspect 620. Accordingly, given the abundance of green pixels compared to blue and red pixels, fewer nearest-neighboring pixels may be required, and consequently identified, to analyze for defects when the identified pixel 621 belongs to the green or IR color channels.

In aspect 630, the 9×9 pattern of pixels is demonstrated again. While aspect 630 also includes green image pixel (identified pixel 631) like identified pixel 621 in aspect 620, additional neighboring image pixels may be captured for defective pixel detection processes. In this example, the neighboring image pixels with respect to identified pixel 631 form diamond pattern 632 that includes eight nearest-neighboring green pixels. Such nearest-neighboring pixels are numbered 1-8 in aspect 630. Any number of nearest-neighboring image pixels can be used to analyze for defects of pixels of any color channel.

In aspect 640, the same 9×9 pattern of pixels is demonstrated. A green image pixel, identified pixel 641, is selected in aspect 640. Unlike aspect 620, however, additional neighboring image pixels may be captured for defective pixel detection processes. In this example, the neighboring green image pixels with respect to identified pixel 641 form square pattern 642 that includes eight nearest-neighboring green image pixels. The nearest-neighboring image pixels are numbered 1-8 in aspect 640. The square pattern 642, among other patterns identified in aspects 620 and 630 alike, can also be used when the identified pixel belongs to the IR color channel.

Figure 7:
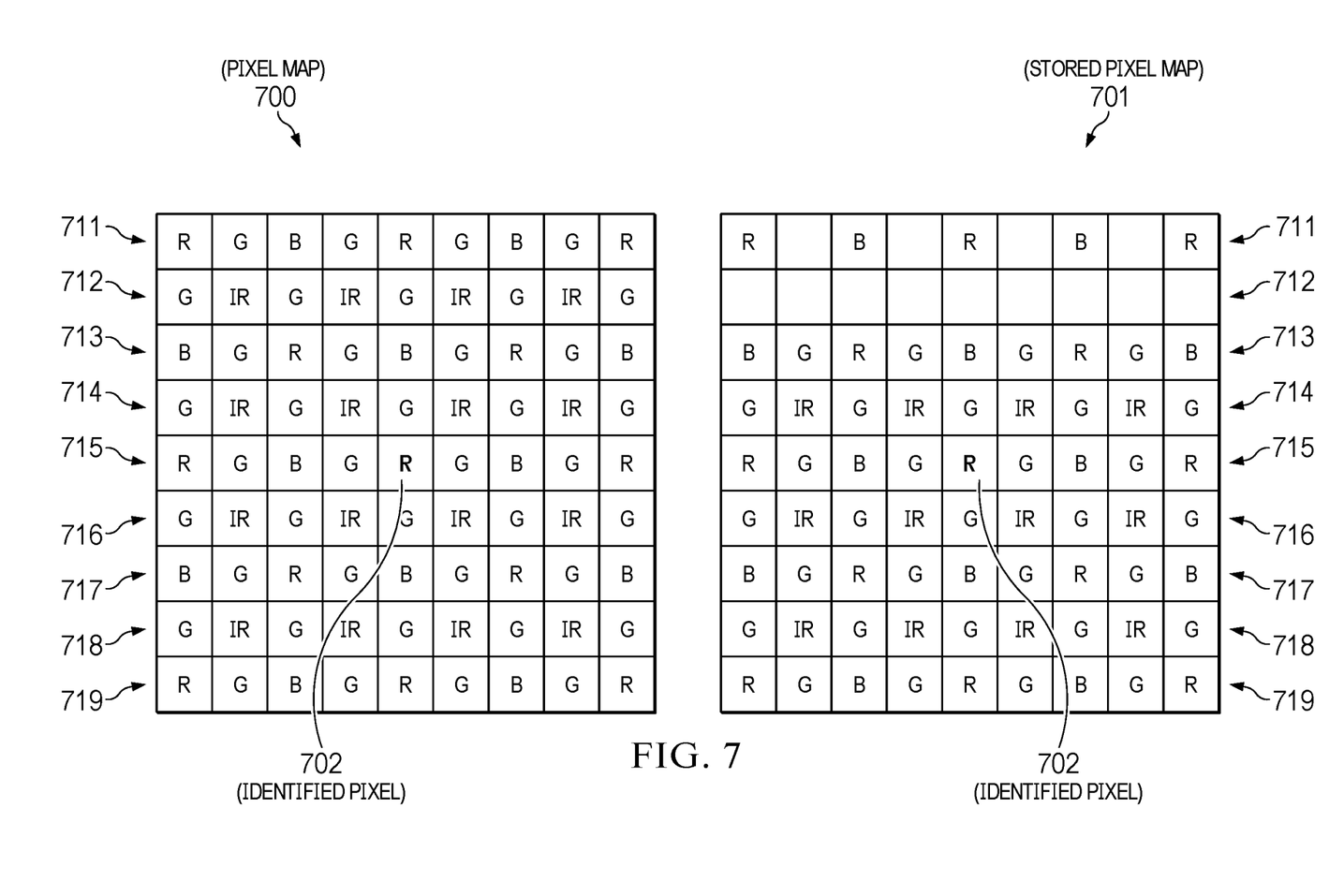
FIG. 7 illustrates an example of pixel selection for optimizing storage and processing during pixel defect detection processes.

FIG. 7 illustrates an example of pixel selection for optimizing storage and processing during pixel defect detection. FIG. 7 shows pixel map 700 and stored pixel map 701. Pixel map 700 represents an exemplary image pixel arrangement producible by components of system 100 of FIG. 1, for example, to evaluate image pixels of an input. Stored pixel map 701 represents an arrangement of image pixels, based on pixel map 700, of which selected pixels may be stored in system memory, subsystem memory, or other memory.

In pixel map 700, a 9×9 pattern of image pixels of varying color channels is demonstrated. Pixel map 700 may represent the entirety of pixels of an input (e.g., an image), or it can represent a subset of the entirety of pixels of the input. Identified pixel 702 represents one image pixel selected during a defective pixel detection process. In pixel map 700, identified pixel 702 is a red image pixel located in row 715. Nearest-neighboring pixels belonging to the red color channel are also located in pixel map 700, and they can be found in rows 711, 713, 715, 717, and 719.

In various examples, a pixel processing subsystem can identify pixel map 700 from the input, including which color channel each image pixel belongs to. The pixel processing subsystem can further be configured to not store, or discard, certain pixel data that does not relate to the identified image pixel and the one or more nearest-neighboring image pixels. For example, the pixel processing subsystem may recognize that pixel map 700 makes up a subset of the image pixels in an image (i.e., nine rows and columns of the image pixels of the image). Accordingly, the pixel processing subsystem may store all of the rows and columns of image pixels of the image, including pixel map 700. However, the pixel processing subsystem can determine that to process pixel map 700, or a certain image pixel of a color channel in pixel map 700, not all of the image pixels need to be stored. Following the example in FIG. 7 wherein the identified pixel 702 is a red image pixel, the pixel processing subsystem may not need to use blue, green, or IR image pixels to find a defect in identified pixel 702. The pixel processing subsystem can, consequently, remove some of the unrelated image pixels from pixel map 700 when processing for defects.

This leads to stored pixel map 701, which demonstrates the same 9×9 pattern of image pixels as pixel map 700 but without some of the unnecessary image pixels (i.e., pixels of color channels different from identified pixel 702). Stored pixel map 701 represents the pixel arrangement that may be stored in a device memory of a pixel processing subsystem, for example. It may be noted that green and IR pixels from rows 711 and 712 do not exist in stored pixel map 701. This is because identified pixel 702 belongs to the red color channel, so data related to green and IR image pixels may be unnecessary when detecting whether a defect exists in a red image pixel. In other words, a pixel processing subsystem can recognize that data from rows 711 and 712 is unnecessary to store because red image pixels do not exist in those rows. Advantageously, by reducing the number of image pixels stored, represented by stored pixel map 701, a pixel processing subsystem can detect defects more efficiently, among other benefits.

An arrangement such as one demonstrated in stored pixel map 701 may also be produced when identified pixel 702 is a blue image pixel because non-blue image pixel data from rows 711 and 712, among other pixel data not shown, is not needed to detect defects in a blue image pixel. It follows that a pixel processing subsystem can discard an entire row of pixels of an image, including pixels of a 9×9 pixel map, if pixels of the blue or red color channels do not reside there. Further, non-blue and red pixels can be removed from another row in the pixel map for the same reason.

Figure 8:
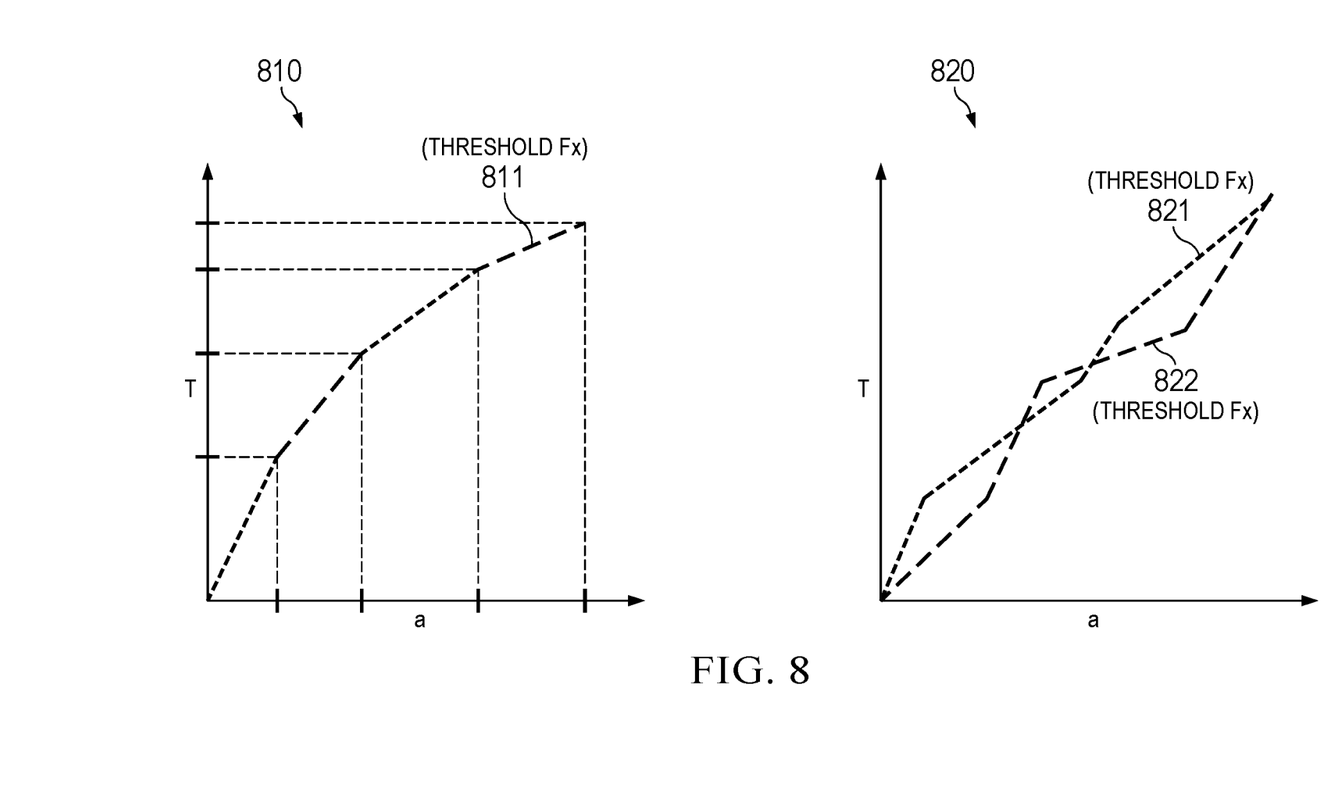
FIG. 8 illustrates exemplary graphical representations of threshold values of different threshold functions used for pixel defect detection.

FIG. 8 illustrates exemplary graphical representations of threshold values of different threshold functions used for pixel defect detection. FIG. 8 includes graphical representations 810 and 820. Graphical representation 810 further includes threshold function 811, defined using a look-up table, and graphical representation 820 further includes two threshold functions 821 and 822, each defined using two different look-up tables. In various examples, each threshold function of graphical representations 810 and 820 includes ranges of pixel values calculated using one or more piecewise linear functions, the values of which can be compared against to indicate whether a pixel is defective or non-defective.

Graphical representation 810 includes one threshold function, threshold function 811, with several knee points separating varying slopes within the values of threshold function 811. Threshold function value 811 may be used for any of the color channels (e.g., red, blue, green, or IR) present in a given frame or image. In various examples, threshold values of nearest-neighboring pixels with respect to a pixel are determined by performing one or more operations on the nearest-neighboring image pixels with respect to a given image pixel of a color channel. For example, the threshold values can be function of mean where $a=[x(2)+x(p-1)]/2$, and the threshold value can be calculated using the equation $T=f(a)$. The function, f, or threshold function 811 as illustrated in FIG. 8, can be a piecewise linear function that can be calculated on the fly depending on the color channel of the pixel.

In an example, the piecewise linear function can have up to S segments ($[0, S-1]$) for n-bit pixel values. In such an example, a lookup table of size 'b' may include a number of unique knee points to define individual segments of a piecewise linear function, f. Specifically, the lookup table may have 7 unique knee points to define 8 segments of the functions, whereby b[0]=0<b[1]<b{2]<b[3]<b[4]<b[5]<b[6]<b[7]. The segment, s, in which a particular mean 'a' falls can be found using the following equation:

$$s = \begin{cases} \underset{i \in \{0, 1, \ldots, 6\}}{\arg} (b[i] \le a < b[i+1]) & \text{IF } a < b[7] \\ 7 & \text{Otherwise} \end{cases}$$

In another example, threshold function 811 of graphical representation 810 can be a piecewise linear function, f, that can have up to S ([0, S−1]) segments for S bit pixel values. This piecewise linear function can be calculated using the following equation:

$$f(a)=t(s)+m(s)x(a-b(s)).$$

In this equation, s, in [0 . . . S−1], is the segment in which 'a' falls. b(s) is the base value of f(a) for the segment, s, and t(s) and m(s) are the base threshold and the slope for the function, f, in the segment respectively. The (S−1) base, base threshold, and slope value tuples required can be stored and executed in the threshold functions.

In another example, the threshold function 811 knee points can be implicitly defined as b(0)=0, b(k)=$2^{k+8} \forall k \in$ [1 . . . 7]. Here, the distance between consecutive knee points increases exponentially.

Regardless of which lookup table or function is used, threshold function 811 can be mapped to one or more image pixel color channels. So, if a red image pixel is identified, threshold function 811 can be applied to the nearest-neighboring red image pixels, and if a blue image pixel is identified, threshold 811 may also be used, or any other threshold function or range of values within a threshold value can be used. Any combination or variation of threshold functions and color channels can be used.

Alternatively, one or more of the lookup tables represented in graphical representation 820 may be employed, which includes threshold functions 821 and 822. The values, or ranges of values, of threshold functions 821 and 822 have varying slopes with respect to each other and to the threshold function of the lookup table in graphical representation 810. Accordingly, lookup tables in graphical representation 820 can be used to generate different threshold values when applied to nearest-neighboring pixels, and thus, defects may be detected based on such differing criteria.

While some examples provided herein are described in the context of an imaging subsystem, image sensor, layer, or environment, the pixel defect detection and correction systems and methods described herein are not limited to such embodiments and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are inclusive meaning "including, but not limited to." In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A. A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method, comprising:
identifying a color channel of an image pixel in a frame;
identifying a threshold function based on the color channel;
identifying one or more nearest-neighboring image pixels with respect to the image pixels, in which the nearest-neighboring image pixels are of the color channel of the image pixel;
applying the threshold function to the one or more nearest-neighbor image pixel values to obtain a threshold value; and
determining whether a corresponding sensor pixel is defective based on a comparison of the image pixel to the threshold value
wherein the identifying of the threshold function further includes identifying an offset pattern of the one or more nearest-neighboring image pixels specific to a subset of color channels to which the image pixel and the one or more nearest-neighboring pixels belong.

2. The method of claim 1, further comprising storing a value of the image pixel and a subset of the one or more nearest-neighbor values based on the offset pattern.

3. The method of claim 1, wherein the one or more nearest-neighbor values comprise an average value of the one or more nearest-neighbor image pixels.

4. The method of claim 1, wherein the color channel is one among a red color channel, a blue color channel, a green color channel, and an infrared color channel.

5. The method of claim 1, further comprising correcting the image pixel in the frame.

6. A pixel processing subsystem, comprising:
a processing device; and
device memory operatively coupled to the processing device and system memory, wherein the device memory provides the pixel processing subsystem with pixel data from the system memory;
wherein the processing device is configured to:
identify a color channel of an image pixel in a frame;
identify a threshold function based on the color channel;
identifying nearest-neighboring image pixels with respect to the image pixels, in which the nearest-neighboring image pixels are of the color channel of the image pixel;
apply the threshold function to one or more nearest-neighbor values to obtain a threshold value; and
determine whether a corresponding sensorpixel is defective based on a comparison of the image pixel to the threshold value;
wherein the identifying of the threshold function further includes identifying an offset pattern of the nearest-neighboring image pixels specific to a subset of color channels to which the image pixel and the nearest-neighboring pixels belong.

7. The pixel processing subsystem of claim 6, further comprising determining a representative value of the nearest-neighbor image pixels, wherein the applying of the threshold function includes applying the threshold function to the representative value.

8. The pixel processing subsystem of claim 6, wherein the processing device is further configured to store a value of the image pixel and a subset of the nearest-neighbor values based on the offset pattern.

9. The pixel processing subsystem of claim 6, wherein the processing device is further configured to, in response to determining that the corresponding sensor pixel is defective, store defective pixel data corresponding to the defective sensor pixel and produce defective pixel metrics indicative of a number of defective sensor pixels based on the defective pixel data.

10. The pixel processing subsystem of claim 6, wherein the color channel is one among a red color channel, a blue color channel, a green color channel, and an infrared color channel.

11. The pixel processing subsystem of claim 6, wherein the processing device is further configured to correct the image pixel in the frame.

12. The pixel processing subsystem of claim 7, wherein the representative value is an average value.

13. A system, comprising:
a defective pixel detection component configured to:
identify a color channel of an image pixel in a frame;
identify a threshold function based on the color channel;
identify nearest-neighboring image pixels with respect to the image pixel, in which the nearest-neighboring image pixels are of the color channel of the image pixel;
apply the threshold function to nearest-neighbor values to obtain a threshold value; and
determine whether a corresponding sensor pixel is defective based on a comparison of the image pixel to the threshold value,
wherein the identifying of the threshold function further includes identifying an offset pattern of the nearest-neighboring image pixels specific to a subset of color channels to which the image pixel and the nearest-neighboring pixels belong; and a pixel corrector component configured to correct the image pixel.

14. The system of claim 13, further comprising determining an average value of nearest-neighbor image pixel values, wherein the threshold function is applied to the average value.

15. The system of claim 13, wherein the defective pixel detection component is further configured to store a value of the image pixel and a subset of the nearest-neighbor values based on the offset pattern.

16. The pixel processing unit of claim 13, wherein the defective pixel detection component is further configured to, in response to determining that the corresponding sensor pixel is defective, store defective pixel data corresponding to the defective sensor pixel and produce defective pixel metrics indicative of a number of defective sensor pixels based on the defective pixel data.

17. The system of claim 13, wherein the color channel is one among a red color channel, a blue color channel, a green color channel, and an infrared color channel.

\* \* \* \* \*